US012356303B2

(12) United States Patent
Ito et al.

(10) Patent No.: US 12,356,303 B2
(45) Date of Patent: Jul. 8, 2025

(54) INFORMATION PROCESSING APPARATUS AND COMMUNICATION SYSTEM

(71) Applicants: TOYOTA JIDOSHA KABUSHIKI KAISHA, Aichi-ken (JP); DENSO TEN Limited, Hyogo (JP)

(72) Inventors: Noriaki Ito, Toyota (JP); Hiroki Kawasaki, Toyota (JP); Hiroto Nakagawa, Nagoya (JP); Satoru Ikeda, Hyogo (JP)

(73) Assignees: TOYOTA JIDOSHA KABUSHIKI KAISHA, Toyota (JP); DENSO TEN Limited, Hyogo (JP)

( * ) Notice: Subject to any disclaimer, the term of this patent is extended or adjusted under 35 U.S.C. 154(b) by 410 days.

(21) Appl. No.: 17/948,779

(22) Filed: Sep. 20, 2022

(65) Prior Publication Data

US 2023/0088826 A1    Mar. 23, 2023

(30) Foreign Application Priority Data

Sep. 21, 2021  (JP) .................................. 2021-153627

(51) Int. Cl.
*H04W 4/90* (2018.01)
*H04W 60/00* (2009.01)
*H04W 60/06* (2009.01)
*H04W 76/10* (2018.01)
*H04W 36/14* (2009.01)

(52) U.S. Cl.
CPC ............. *H04W 4/90* (2018.02); *H04W 60/00* (2013.01); *H04W 60/06* (2013.01); *H04W 76/10* (2018.02); *H04W 36/1446* (2023.05)

(58) Field of Classification Search
CPC ....... H04W 4/90; H04W 76/10; H04W 60/00; H04W 60/06; H04W 36/1446
USPC ............................................. 370/329
See application file for complete search history.

(56) References Cited

U.S. PATENT DOCUMENTS

| | | | |
|---|---|---|---|
| 7,457,625 B2 * | 11/2008 | Krenik .................. | H04W 16/14 455/452.2 |
| 7,787,856 B1 * | 8/2010 | Klesper ............... | H04M 7/1235 455/445 |
| 8,249,546 B1 * | 8/2012 | Shah ..................... | H04W 76/50 455/450 |
| 10,575,368 B2 * | 2/2020 | Feher .................. | H04L 27/0008 |
| 2007/0091876 A1 * | 4/2007 | Araki .................. | H04M 7/1285 370/352 |

(Continued)

FOREIGN PATENT DOCUMENTS

| | | |
|---|---|---|
| JP | 2017-527172 A | 9/2017 |
| JP | 2020-167557 A | 10/2020 |

(Continued)

*Primary Examiner* — Anthony Mejia
(74) *Attorney, Agent, or Firm* — Sughrue Mion, PLLC (57) ABSTRACT

The present disclosure provides a system capable of rapidly communicating information. In the present disclosure, an information processing apparatus including a first communication module configured to use a cellular communication network and a second communication module configured to use a wireless communication network other than the cellular communication network performs a predetermined process related to communication performed by the first communication module when receiving first data via the second communication module.

11 Claims, 8 Drawing Sheets

(56) References Cited

U.S. PATENT DOCUMENTS

| | | | |
|---|---|---|---|
| 2010/0256992 A1* | 10/2010 | Roberts | G06Q 10/10 |
| | | | 709/219 |
| 2012/0178410 A1* | 7/2012 | Singhal | H04M 1/236 |
| | | | 455/404.1 |
| 2013/0170399 A1 | 7/2013 | Stahlin et al. | |
| 2014/0038668 A1* | 2/2014 | Vasavada | H04L 12/1859 |
| | | | 455/556.1 |
| 2014/0194082 A1* | 7/2014 | Wingert | H04M 3/42221 |
| | | | 455/404.1 |
| 2015/0065076 A1* | 3/2015 | Kim | H04W 76/50 |
| | | | 455/404.1 |
| 2016/0028471 A1* | 1/2016 | Boss | H04W 24/02 |
| | | | 455/406 |
| 2016/0379470 A1* | 12/2016 | Shurtz | H04W 4/16 |
| | | | 455/404.2 |
| 2017/0105104 A1* | 4/2017 | Ulmansky | H04W 4/42 |
| 2017/0171782 A1 | 6/2017 | Mohamed et al. | |
| 2017/0230900 A1* | 8/2017 | Velusamy | H04M 17/204 |
| 2018/0184236 A1* | 6/2018 | Faraone | G09B 29/007 |
| 2019/0166524 A1 | 5/2019 | Mohamed et al. | |
| 2019/0281506 A1* | 9/2019 | Chiang | H04L 65/1069 |
| 2020/0187150 A1* | 6/2020 | Eisner | H04W 76/50 |
| 2020/0322852 A1 | 10/2020 | Mohamed et al. | |
| 2022/0015031 A1 | 1/2022 | Araki | |
| 2022/0247869 A1* | 8/2022 | Johnson | H04M 15/72 |
| 2022/0312146 A1* | 9/2022 | Haney | H04W 4/90 |

FOREIGN PATENT DOCUMENTS

| | | |
|---|---|---|
| KR | 10-1874352 B1 | 7/2018 |
| WO | 2010/130739 A1 | 11/2010 |

\* cited by examiner

INFORMATION PROCESSING APPARATUS AND COMMUNICATION SYSTEM

CROSS-REFERENCE TO THE RELATED APPLICATION

This application claims the benefit of Japanese Patent Application No. 2021-153627, filed on Sep. 21, 2021, which is hereby incorporated by reference herein in its entirety.

BACKGROUND

Technical Field

The present disclosure related to mobile communication.

Description of the Related Art

Systems for performing information gathering by onboard computers are in widespread use (see, for example, Japanese Patent Laid-Open No. 2020-167557).

[Patent document 1] Japanese Patent Laid-Open No. 2020-167557.

SUMMARY

One or more aspects of the present disclosure are directed to provide a system capable of rapidly communicating information.

One aspect of an embodiment of the present disclosure may be an information processing apparatus comprising: a first communication module configured to use a cellular communication network; a second communication module configured to use a wireless communication network other than the cellular communication network; and a controller including at least one processor configured to, when receiving first data via the second communication module, perform a predetermined process related to communication performed by the first communication module.

One aspect of the embodiment of the present disclosure may be an information processing apparatus capable of communicating with a mobile terminal comprising a first communication module and a second communication module, the information processing apparatus comprising a controller including at least one processor configured to, when a predetermined trigger occurs, transmit first data for enabling the first communication module to be used, to the mobile terminal performing communication using the second communication module.

One aspect of an embodiment of the present disclosure may be a communication system comprising: a first apparatus comprising a first communication module configured to use a cellular communication network and a second communication module configured to use a wireless communication network other than the cellular communication network; and a second apparatus; wherein, when a predetermined trigger occurs, the second apparatus transmits first data for enabling the first communication module to be used, to the first apparatus performing communication using the second communication module; and, when receiving the first data, the first apparatus performs attachment to the cellular communication network.

Another aspect of the present disclosure may be a computer-readable storage medium that non-transitorily stores a program for causing a computer to execute a method executed by any of the information processing apparatuses described above.

According to the present disclosure, it is possible to provide a system capable of rapidly communicating information.

DESCRIPTION OF THE EMBODIMENTS

Recently, automobiles capable of network connection have been widespread. By an onboard apparatus providing network connection, it is possible to provide a service of providing support in an emergency and security services. Such an apparatus is also referred to as a data communication module (DCM). A DCM can perform communication using a communication standard for cellular communication, a wireless LAN or the like.

There is a problem that a communication opportunity is not equally given depending a communication standard that a DCM uses. For example, though a vehicle including a communication contract for performing cellular communication can always perform communication while traveling, a vehicle not including the contract cannot perform communication unless the vehicle is in a public wireless LAN service area.

An information processing apparatus according to the present disclosure solves such a problem.

An information processing apparatus according to one aspect of the present disclosure may include: a first communication module configured to use a cellular communication network; a second communication module configured to use a wireless communication network other than the cellular communication network; and a controller including at least one processor configured to, when receiving first data via the second communication module, perform a predetermined process related to communication performed by the first communication module.

An information processing apparatus according to the present disclosure may be typically a communication apparatus mounted on a vehicle.

The information processing apparatus may include a first communication module and a second communication module. The first communication module may be a communication module using a cellular communication network (a mobile communication network), and the second communication module is a communication module using a wireless communication network other than the cellular communication network. The second communication module may perform communication using a public wireless LAN network, a road-to-vehicle communication network, a vehicle-to-vehicle communication network or the like according to a communication standard, for example, IEEE 802.11, DSRC, Millimeter Wave Communication or the like.

By using the cellular communication network, it is possible to perform stable communication even during movement. However, since conclusion of a communication contract and payment of a usage fee are required to use the cellular communication network, a vehicle user may use the apparatus without concluding a communication contract.

On the other hand, a network such as a public wireless LAN can be used for free, but it is not possible to perform communication in a place where there is not an access point. Furthermore, when such a network uses a wireless communication standard through which handover cannot be performed, there may be a case where communication stops accompanying movement of a vehicle.

The controller may perform a predetermined process related to communication performed by the first communication module when receiving first data via the second communication module. As the predetermined process, for example, a process for causing a cellular line to be temporarily opened in order to cause important communication to be performed is exemplified.

The first data may be typically data notifying that such an event that a module to be used for communication should be switched from the second communication module to the first communication module has occurred. As such data, for example, data notifying occurrence of an earthquake, occurrence of a disaster or occurrence of important vehicle recall is exemplified.

When a contract for using the first communication module has not been concluded by the user, the first communication module may be temporarily attached to the cellular communication network using temporary contract information.

According to such a configuration, it becomes possible to, when an emergency or the like including a disaster occurs, cause the vehicle to temporarily use the cellular communication network and provide a stable communication environment.

An information processing apparatus according to another aspect of the present disclosure is an apparatus that transmits the first data described above.

Specifically, the apparatus includes a controller configured to, when a predetermined trigger occurs, transmit first data for enabling the first communication module to be used, to the mobile terminal performing communication using the second communication module.

The first data may be data giving an instruction to switch the communication module as described above or may be data for validating the first communication module (contract information or the like).

The predetermined trigger may be such that occurs when it is judged that it is necessary to cause a mobile terminal (the vehicle) to perform important communication.

A specific embodiment of the present disclosure will be described below based on drawings. A hardware configuration, a module configuration, a functional configuration and the like described in each embodiment are not intended to limit the technological scope of the disclosure only to the embodiment unless otherwise stated.

First Embodiment

Figure 1:
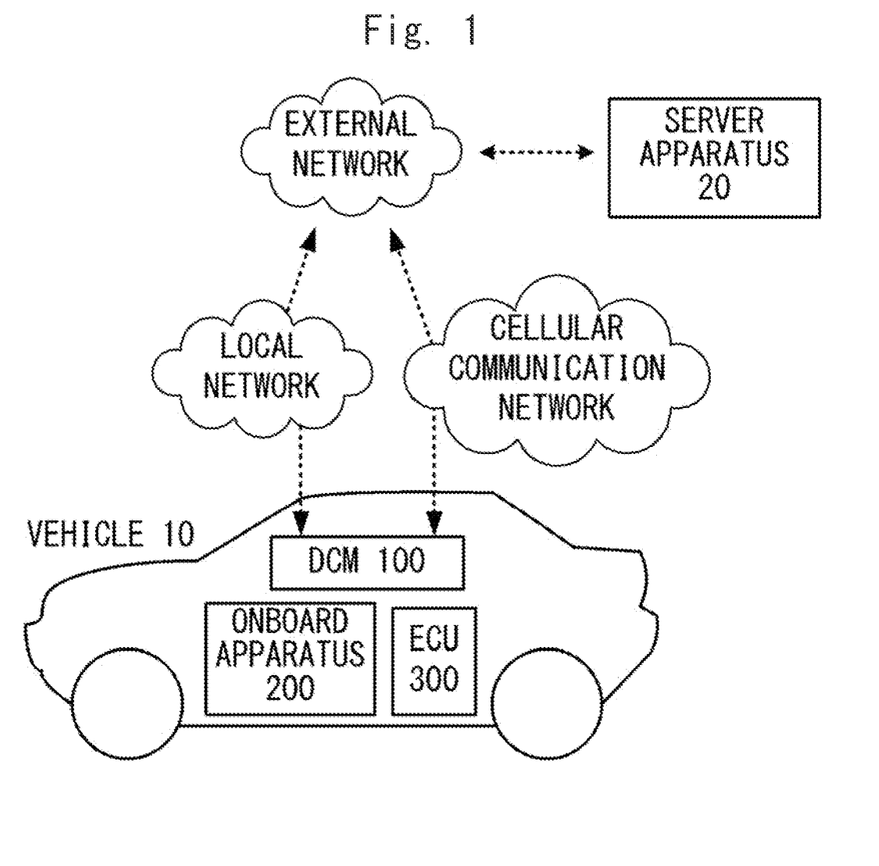
FIG. 1 is a schematic diagram of a vehicle system according to a first embodiment.

An outline of a vehicle system according to a first embodiment will be described with reference to FIG. 1. The vehicle system according to the present embodiment is configured including vehicles 10 and a server apparatus 20.

Each vehicle 10 is a connected car including a function of communicating with an external network. The vehicle 10 is configured including a DCM (data communication module) 100, an onboard apparatus 200, electronic control units (also referred to as ECUs) 300. Though a single ECU 300 is illustrated in FIG. 1, the vehicle 10 may include a plurality of ECUs 300.

The DCM 100 is an apparatus that performs wireless communication with the external network. The DCM 100 functions as a gateway for connecting a component that the vehicle 10 includes (hereinafter referred to as a vehicle component) to the external network. For example, the DCM 100 provides access to the external network for the onboard apparatus 200 and the ECUs 300 that the vehicle 10 includes. Thereby, the onboard apparatus 200 and the ECUs 300 can communicate with an external apparatus connected to the network via the DCM 100.

The DCM 100 is configured to be capable of performing communication using two communication channels of a mobile communication network and a local network. The mobile communication network is a communication network using a cellular network (hereinafter a cellular communication network), and a communication contract is required to use it. In the case of using the cellular communication network, it is possible to access the external network even while the vehicle 10 is moving.

The local network is a network provided at a predetermined access point, for example, a wireless LAN network or the like. The vehicle 10 can access the external network only within a range where wireless communication to the access point is possible.

The DCM 100 is configured to be capable of storing contract information for using the cellular communication network, and performs communication via the cellular communication network when valid contract information about a communication contract concluded by the user exists. When the contract information does not exist, the DCM 100 accesses the external network only via the local network.

The onboard apparatus 200 is an apparatus that provides information for the driver of the vehicle 10. The onboard apparatus 200 is also called a car navigation apparatus, an infotainment apparatus or a head unit. It is possible to provide navigation and entertainment for the driver of the vehicle 10 by the onboard apparatus 200. The onboard apparatus 200 may download traffic information, road map data, music, video and the like via the DCM 100.

The server apparatus 20 is an apparatus that provides information for the vehicle 10. In the present embodiment, the server apparatus 20 provides information with high urgency such as information about a disaster and information about vehicle safety. As the information about a disaster, for example, information about a disaster occurrence situation, information about evacuation and information about lifelines are exemplified. As the information about vehicle safety, recall information and the like are exemplified. When receiving such information, the DCM 100 mounted on the vehicle 10 provides the information via the onboard apparatus 200.

Furthermore, the server apparatus 20 may be capable of distributing data about vehicle safety. As such data, for example, software for updating an ECU is exemplified.

Figure 2:
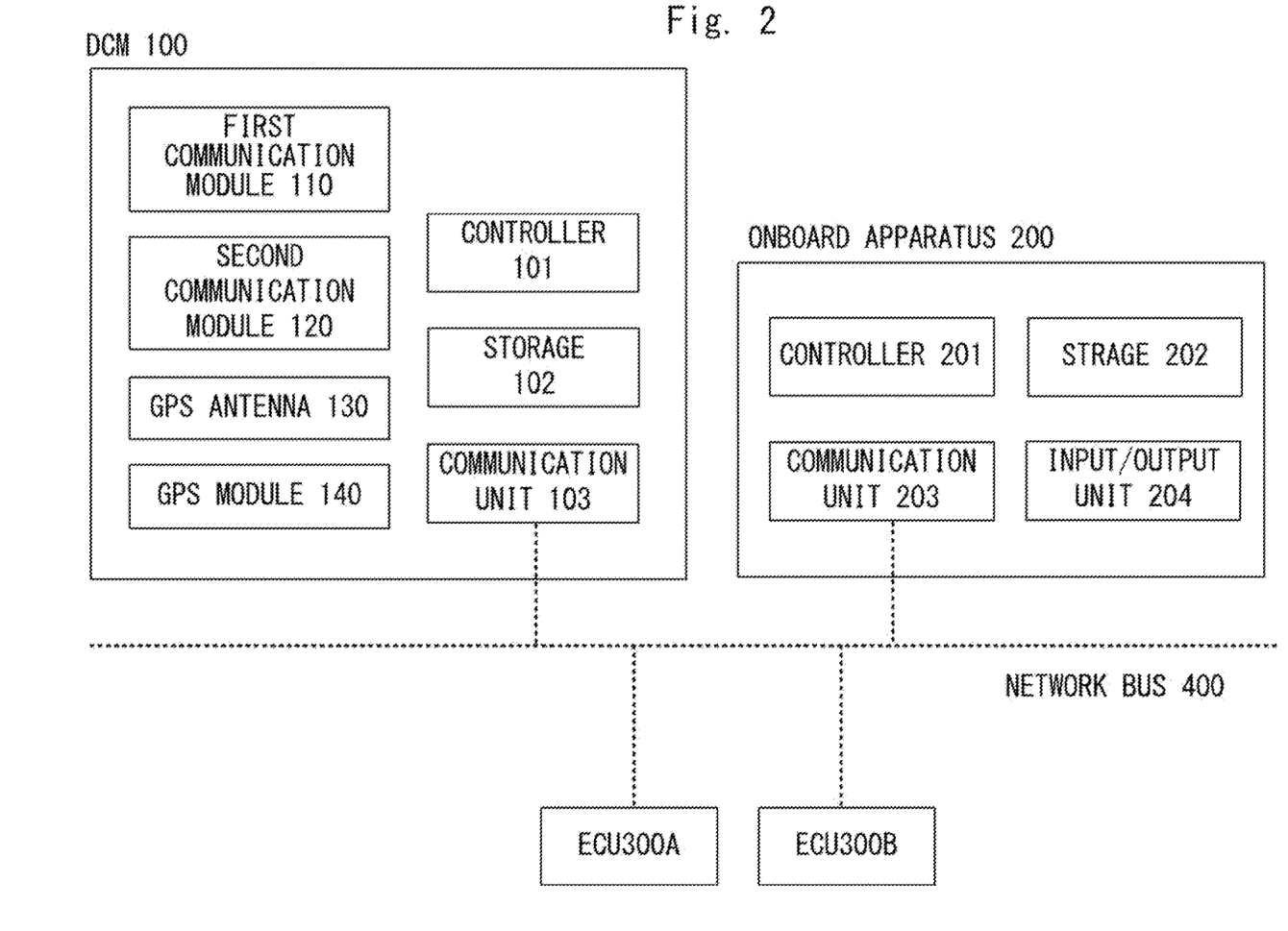
FIG. 2 is a diagram illustrating components that a vehicle according to a first embodiment includes.

FIG. 2 is a diagram illustrating components that the vehicle 10 according to the present embodiment includes. The vehicle 10 according to the present embodiment is configured including the DCM 100, the onboard apparatus 200, a plurality of ECUs 300A, 300B, . . . (hereinafter generically called the ECUs 300).

The ECUs 300 may include a plurality of ECUs that is responsible for different vehicle components. As the plurality of ECUs, for example, a body ECU, an engine ECU, a hybrid ECU, a power train ECU and the like can be exemplified.

The DCM 100 is configured including a first communication module 110, a second communication module 120, a GPS antenna 130, a GPS module 140, a controller 101, a storage 102 and a communication unit 103.

The first communication module 110 is a communication module that performs communication with the outside by cellular communication. The first communication module 110 is configured including antenna elements that perform input/output of wireless signals. In the present embodiment, the antenna elements are such that are suitable for mobile communication (for example, 3G, LTE and 5G).

The second communication module 120 is a communication module that performs communication with the outside according to a communication standard other than standards for cellular communication. As communication standards that the second communication module 120 can adopt, for example, Wi-Fi (registered trademark), DSRC (Dedicated Short Range Communications) and Millimeter Wave Communication can be exemplified. The second communication module 120 is configured including antenna elements that perform input/output of wireless signals similarly to the first communication module 110. The antenna may be configured including a plurality of physical antennas. For example, in the case of performing mobile communication using radio waves in a high frequency band, such as microwaves or millimeter waves, the plurality of antennas may be distributedly arranged in order to stabilize communication.

The GPS antenna 130 is an antenna that receives a positioning signal transmitted from a positioning satellite (also referred to as a GNSS satellite).

The GPS module 140 is a module that calculates position information based on a signal received by the GPS antenna 130.

The controller 101 is an arithmetic unit that realizes various kinds of functions of the DCM 100 by executing a predetermined program. The controller 101 may be realized, for example, by a CPU and the like.

The controller 101 executes a function of mediating communication performed between the external network and a component that the vehicle 10 includes (a vehicle component). For example, when a certain vehicle component requires communication with the external network, the controller 101 executes a function of relaying data transmitted from the vehicle component to the external network. Further, the controller 101 executes a function of receiving data transmitted from the external network and transferring the data to an appropriate vehicle component.

Furthermore, the controller 101 can execute a function specific unique to the DCM 100. For example, the controller 101 is configured to be capable of executing a monitoring function and a telephone conversation function of a security system and can make a security report, an emergency report or the like based on a trigger that has occurred in the vehicle 10.

The storage 102 is a memory device that includes a main memory and an auxiliary storage device. In the auxiliary storage device, an operating system (OS), various kinds of programs, various kinds of tables and the like are stored. By loading a program stored therein to the main memory and executing the program, each function that meets a predetermined purpose, which is described later, can be realized.

The communication unit 103 is an interface unit for connecting the DCM 100 to an onboard network. In the present embodiment, a plurality of vehicle components including the onboard apparatus 200 and the ECUs 300 are mutually connected via a bus 400 of the onboard network. As a standard for the onboard network, for example, CAN (Controller Area Network) can be exemplified. When the onboard network is such that uses a plurality of standards, the communication unit 103 may include a plurality of interface devices corresponding to standards of communication destinations. As a communication standard other than CAN, for example, Ethernet (registered trademark) can be exemplified.

The DCM 100 may be configured to be capable of operating independently from the other components that the vehicle 10 includes. For example, an auxiliary battery may be included in the DCM 100 so that the DCM 100 can operate alone without depending on an external power source. According to such a configuration, even when a malfunction of another component of the vehicle 10 (for example, a power supply malfunction) occurs due to a traffic accident or the like, an emergency report or the like can be made.

Figure 3A:
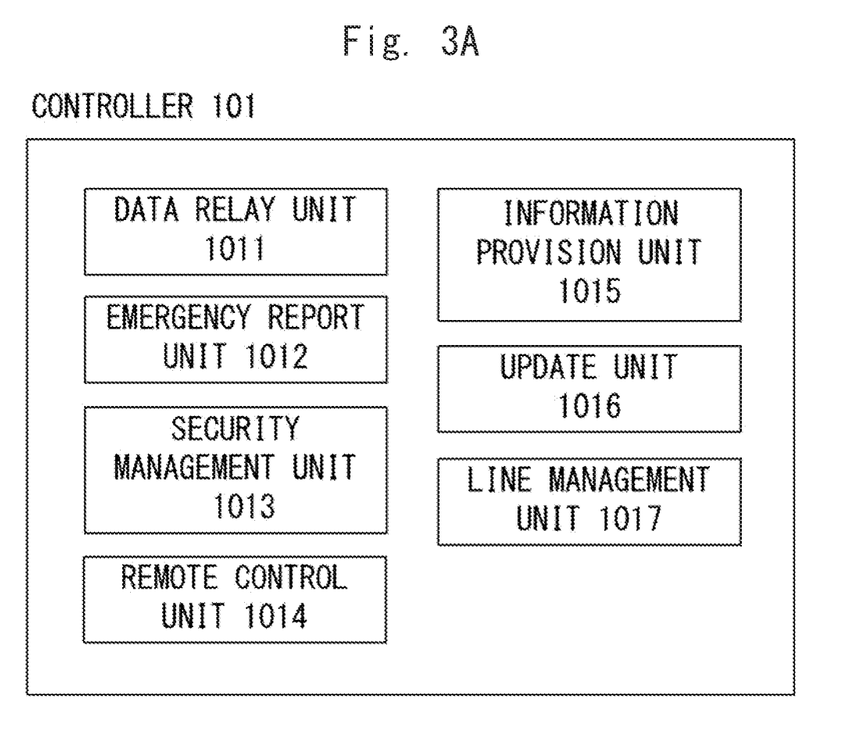
FIG. 3A is a schematic diagram illustrating functional modules that a controller includes.

Next, functions executed by the controller 101 will be described. FIG. 3A is a schematic diagram illustrating functional modules that the controller 101 includes. The functional modules that the controller 101 includes can be realized by executing a program stored in storage means such as a ROM by the controller 101.

A data relay unit 1011 relays data transmitted/received among the vehicle components. For example, the data relay unit 1011 executes a process of receiving a message sent out by a first apparatus connected to the onboard network and, when necessary, transferring the message to a second apparatus connected to the onboard network. The first and second apparatuses may be ECUs 300 or may be other vehicle components.

When receiving a message addressed to the external network from a vehicle component, the data relay unit 1011 relays the message to the external network. Further, the data relay unit 1011 receives data transmitted from the external network and transfers the data to an appropriate vehicle component.

When an abnormal situation occurs on the vehicle 10, an emergency report unit 1012 makes an emergency report to an operator outside the vehicle 10. As an example of the abnormal situation, occurrence of a traffic accident or a vehicle breakdown is given. When a predetermined trigger, for example, pushing down of a call button provided in the vehicle 10 or development of an airbag occurs, the emergency report unit 1012 starts connection to the operator and enables telephone conversation between the driver of the vehicle 10 and the operator. At the time of making the emergency report, the emergency report unit 1012 may transmit position information about the vehicle 10 to the operator. In this case, the emergency report unit 1012 may acquire the position information from the GPS module 140.

A security management unit 1013 performs a security monitoring process. The security management unit 1013 detects that the vehicle 10 has been unlocked not by a regular procedure, based on data received from an ECU 300 that is responsible for the electronic lock of the vehicle 10, and transmits a security report to a predetermined apparatus. The security report may include position information about the vehicle 10. In this case, the security management unit 1013 may acquire the position information from the GPS module 140. The security management unit 1013 may be adapted to, when judging that a security problem of the vehicle 10 has occurred, acquire position information and periodically transmit the acquired information to an external apparatus specified in advance.

A remote control unit 1014 controls operation of a component that the vehicle 10 includes, based on a request transmitted from the outside of the vehicle 10. Components targeted by remote control are, typically, pieces of air conditioning equipment including a car air conditioner but may be components other than the pieces of air conditioning equipment. For example, seat heaters, a steering heater and a defroster may be targeted by remote control. For example, the remote control unit 1014 receives an instruction to cause air conditioning of the vehicle 10 to operate from the external network, and causes any of the plurality of pieces of air conditioning equipment to operate based on the instruction.

An information provision unit 1015 receives information transmitted by the server apparatus 20 and provides the information for the driver. The information provided by the server apparatus 20 is, typically, information with high urgency as described before, but the information provision unit 1015 may receive and output information other than information with high urgency. When receiving information with high urgency, the information provision unit 1015 outputs a message, an image, voice or the like via the onboard apparatus 200. At this time, an existing process may be interrupted. For example, when receiving information with high urgency while providing navigation guidance, the information provision unit 1015 may discontinue the navigation and output the received information.

An update unit 1016 updates software used by the DCM 100 or the electronic control units (ECUs 300) that the vehicle 10 includes. For example, the update unit 1016 manages versions of pieces of firmware stored in the plurality of ECUs 300. When new firmware is provided by an external apparatus, the update unit 1016 executes a process for downloading the firmware via a network and applying the firmware to a target apparatus.

Though the emergency report function, the security function, the remote control function, the information provision function and the software update function have been exemplified as functions provided by the DCM 100, functions of the DCM 100 may be other functions. For example, it is possible to cause the DCM 100 to include a function of performing driving diagnosis, a function of monitoring a state of the driver, a function of performing energy management and the like.

A line management unit 1017 manages communication lines used by the DCM 100.

Here, the communication lines that the DCM 100 can use will be described. As illustrated in FIG. 1, the DCM 100 can perform communication with the external network through any of a communication path using the cellular communication network and a communication path using the local network.

When there is valid contract information for cellular communication, the line management unit 1017 causes the DCM 100 to attach to the cellular communication network. When there is not valid contract information, the line management unit 1017 performs connection only to the local network.

When both of the cellular communication network and the local network are available, the line management unit 1017 performs communication, preferentially using the local network.

As described before, when a communication contract for using the cellular communication network has not been concluded, the DCM 100 performs communication using only the local network. However, when only the local network is used, there is a possibility that, at the time of a disaster or in a case where it becomes necessary to transmit an emergency message, a delay occurs in transmission of information. Furthermore, there is a possibility that secondary damage occurs because the driver of the vehicle 10 cannot make a telephone conversation with an operator in an emergency.

Therefore, in the present embodiment, when a message notifying occurrence of an emergency situation (hereinafter, an emergency message) is transmitted from the server apparatus 20, the line management unit 1017 causes a cellular line to be temporarily opened, using contract information that is available only under a limited condition. Thereby, it becomes possible to cause the DCM 100 to perform important communication. A specific method will be described later.

Figure 3B:
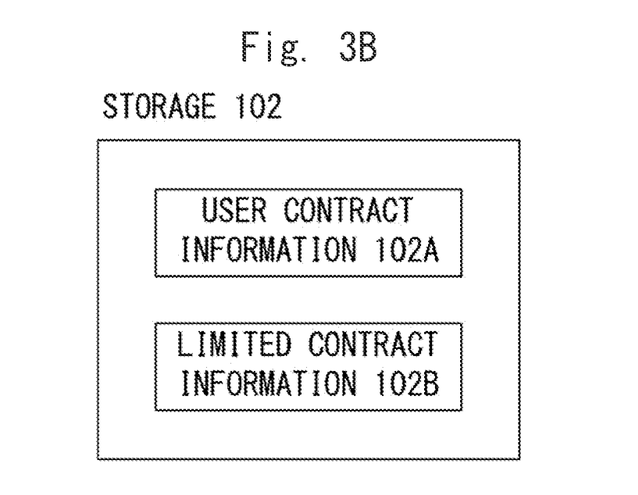
FIG. 3B is a schematic diagram illustrating data stored in a storage.

FIG. 3B is a diagram illustrating data stored in the storage 102.

The storage 102 is configured to be capable of storing user contract information 102A and limited contract information 102B. Each of the pieces of contract information includes an identifier specific to a cellular communication contractor and a telephone number.

The user contract information 102A is information about a communication contract that the user has concluded. When valid user contract information 102A is stored, the line management unit 1017 performs attachment to the cellular communication network using the user contract information 102A.

The limited contract information 102B is information about a communication contract that is limitedly used under a situation that occurrence of an emergency has been notified. The communication contract is concluded, for example, by a vehicle manufacturer with a communication company. Even when valid user contract information 102A is not stored, the DCM 100 can limitedly perform cellular communication under the situation described above.

Returning to FIG. 2, the onboard apparatus 200 will be described.

The onboard apparatus 200 is an apparatus that provides information for the driver of the vehicle 10 and is also called a car navigation system, an infotainment system or a head unit. The onboard apparatus 200 is capable of providing navigation and entertainment for the driver of the vehicle 10. Further, the onboard apparatus 200 may include a function of downloading traffic information, road map data, music, video and the like by communicating with the external network of the vehicle 10. The onboard apparatus 200 may be an apparatus that cooperates with a smartphone or the like.

The onboard apparatus 200 also functions as the front end of the DCM 100. For example, when the DCM 100 executes a predetermined process (for example, an emergency report), the onboard apparatus 200 performs input/output of information related to the process (for example, display of an operator calling state). Further, when the information provision unit 1015 receives information, the onboard apparatus 200 outputs the information.

The onboard apparatus 200 can be configured as a computer including a processor such as a CPU or a GPU, a main memory such as a RAM and a ROM, an EPROM, a hard disk drive and an auxiliary storage device such as a removable medium. In the auxiliary storage device, an operating system (OS), various kinds of programs, various kinds of tables and the like are stored. By executing a program stored therein, each function that meets a predetermined purpose as described later can be realized. A part or all of the functions may be realized by a hardware circuit such as an ASIC or an FPGA.

The onboard apparatus 200 is configured including a controller 201, a storage 202, a communication unit 203 and an input/output unit 204.

The controller 201 is means that is responsible for control of the onboard apparatus 200. The controller 201 is configured, for example, with an information processing unit such as a CPU (central processing unit) or a GPU (graphics processing unit).

The controller 201 performs provision of information for the driver of the vehicle 10. As the provided information, for example, traffic information, navigation information, music and video, radio broadcasting and digital TV broadcasting are exemplified. The controller 201 performs output of information via the input/output unit 204.

The storage 202 is means for storing information and is configured with a storage medium such as a RAM, a magnetic disk or a flash memory. In the storage 202, various kinds of programs executed by the controller 201, data used by the programs and the like are stored.

The communication unit 203 is a communication interface for connecting the onboard apparatus 200 to the bus 400 of the onboard network.

The input/output unit 204 is means for accepting an input operation performed by the user and presenting information to the user. Specifically, the input/output unit 204 is configured with a touch panel and control means therefor, and a liquid crystal display and control means therefor. The touch panel and the liquid crystal display are configured with one touch panel display in the present embodiment. The input/output unit 204 may include a speaker or the like for outputting voice.

Each ECU 300 is an electronic control unit that controls a component that the vehicle 10 includes. The vehicle 10 may include a plurality of ECUs 300. The plurality of ECUs 300 controls components of different systems, for example, an engine system, an electrical system, a power train system and the like, respectively. Each ECU 300 includes a function of generating a prescribed message and periodically performing transmission/reception via the onboard network.

Each ECU 300 can provide a predetermined service by communicating with the external network via the DCM 100. As the predetermined service, for example, a remote service (for example, a remote air conditioning service), a security monitoring service, services in cooperation with a smart home or an automatic parking service (a service for autonomous travel between a parking section and the entrance of a building) is exemplified.

Each ECU 300 can be configured as a computer including a processor such as a CPU or a GPU, a main memory such as a RAM and a ROM, an EPROM, a disk drive and an auxiliary storage device such as a removable medium similarly to the DCM 100.

The network bus 400 is a communication bus constituting the onboard network. Though one bus is illustrated in this example, the vehicle 10 may include two or more buses. The plurality of communication buses may be mutually connected by a gateway that gathers the DCM 100 and the plurality of communication buses.

Figure 4:
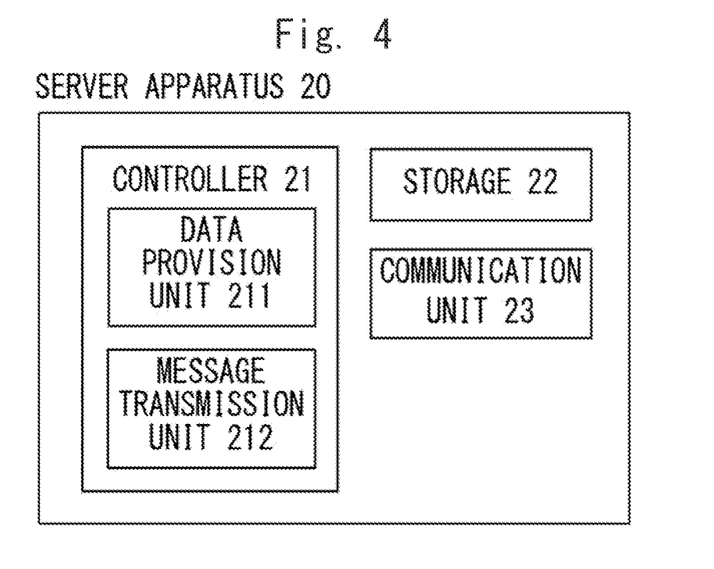
FIG. 4 is a schematic diagram illustrating functional modules that a server apparatus includes.

Next, the server apparatus 20 will be described. FIG. 4 is a schematic diagram of the server apparatus 20 in the first embodiment.

The server apparatus 20 can be configured as a computer including a processor such as a CPU or a GPU, a main memory such as a RAM and a ROM, an EPROM, a hard disk drive and an auxiliary storage device such as a removable medium.

The server apparatus 20 is configured including a controller 21, a storage 22 and a communication unit 23.

The controller 21 is an arithmetic device that is responsible for control performed by the server apparatus 20. The controller 21 can be realized by an arithmetic processing device such as a CPU.

The controller 21 is configured including a data provision unit 211 and a message transmission unit 212 as functional modules. Each functional module may be realized by executing a stored program by the CPU.

The data provision unit 211 provides information for the vehicle 10 (the DCM 100). The provided information may include information with high urgency, for example, information about a disaster. Though an example in which the server apparatus 20 provides information with high urgency is given in the present embodiment, the server apparatus 20 may also serve as an apparatus that provides other information (for example, traffic information or navigation-related information) for the DCM 100 and the onboard apparatus 200.

The message transmission unit 212 transmits a message notifying occurrence of an emergency (an emergency message) and a message notifying cancellation of the emergency (a cancellation message) to the DCM 100.

The emergency message may be transmitted, for example, when an emergency such as an earthquake or a flood occurs or when occurrence of an emergency is expected, or may be transmitted prior to a timing when important information, such as vehicle recall information, should be distributed.

The emergency message can be also grasped as an instruction for causing the DCM 100 to perform connection to the cellular communication network using the limited contract information 102B. By transmitting the emergency message, it becomes possible for the DCM 100 to temporarily perform cellular communication regardless of whether a communication contract has been concluded or not.

The cancellation message is transmitted at a timing when it becomes unnecessary for the vehicle 10 to perform important communication. For example, when the emergency message is such that is transmitted accompanying issuance of a weather warning or the like, the cancellation message may be transmitted when the warning is canceled.

The storage 22 is configured including a main memory and an auxiliary storage device. The main memory is a memory where a program executed by the controller 21 and data used by the control program are developed. The auxiliary storage device is a device where programs executed by the controller 21 and data used by the control programs are stored.

The communication unit 23 is a communication interface for connecting the server apparatus 20 to a network. The communication unit 23 is configured including a network interface board and a wireless communication interface for wireless communication.

Figure 5:
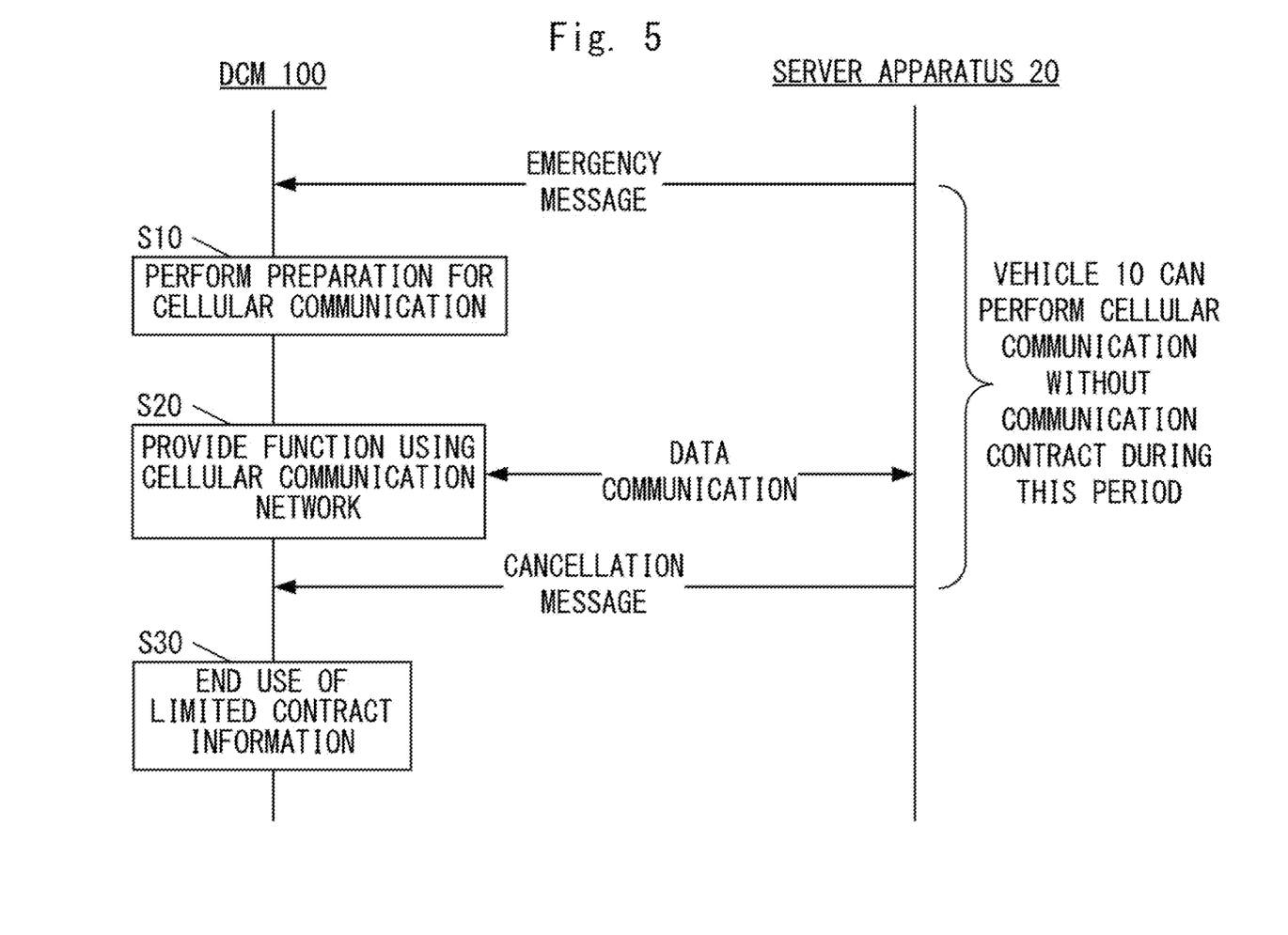
FIG. 5 is a flowchart illustrating a flow of a process performed by components of the system.

Next, an outline of a process for the server apparatus 20 to cause the DCM 100 to connect to the cellular communication network will be described. FIG. 5 is a flowchart illustrating the outline of the process. The illustrated flow is started when the server apparatus 20 judges that it is necessary to cause the vehicles 10 to perform important communication.

When it is judged that it is necessary to cause the vehicles 10 to perform important communication, the server apparatus 20 transmits an emergency message to each of the plurality of vehicles 10 under its control. The emergency message is transmitted to each DCM 100, for example, via the local network.

In response to the emergency message, each vehicle 10 (each DCM 100) prepares for cellular communication (step S10). At this step, the DCM 100 judges whether there is valid user contract information 102A or not and, when there is not valid user contract information 102A, prepares for cellular communication using the limited contract information 102B. Thereby, even when the user has not individually concluded a communication contract, it becomes possible to open a cellular communication line.

When a cellular communication line is opened, each functional module that the DCM 100 includes can communicate via the cellular communication network (step S20). Thereby, for example, it becomes possible for the emergency report unit 1012 to always provide the function of telephone conversation with an operator. It becomes possible for the information provision unit 1015 to wait for important information. It becomes possible for the update unit 1016 to receive data for performing important firmware update.

A partner that the DCM 100 performs communication with via the cellular communication network may be the server apparatus 20 or may be another apparatus (for example, an apparatus that accepts an emergency report) on the external network.

When the server apparatus 20 judges that it becomes unnecessary to cause the vehicle 10 to perform important communication, a cancellation message is transmitted from the server apparatus 20 to the DCM 100. When receiving the cancellation message, the DCM 100 cause use of the limited contract information 102B to end (step S30). Thereby, the DCM 100 is detached from the cellular communication network.

Figure 6:
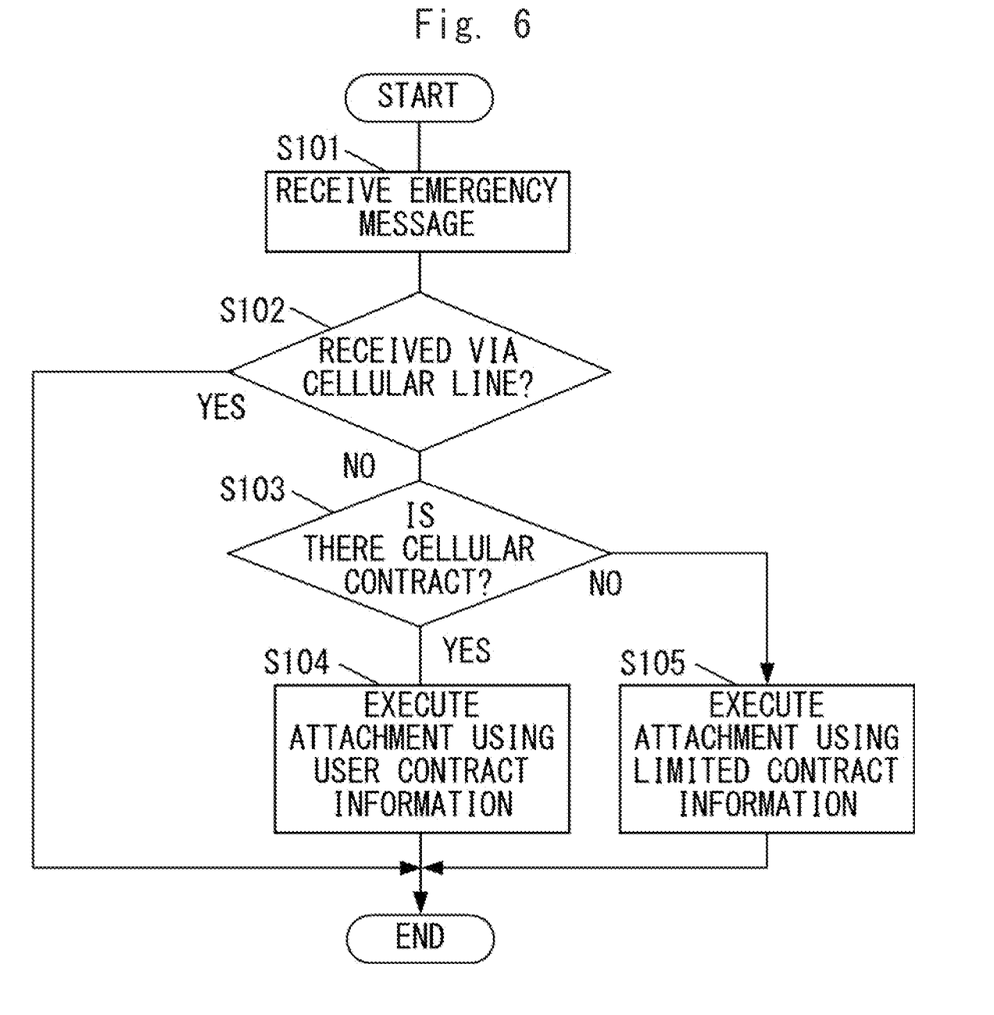
FIG. 6 is a flowchart of a process executed at step S10.

FIG. 6 is a flowchart illustrating the process at step S10 in more detail. The illustrated process is executed by the line management unit 1017 that the DCM 100 includes.

First, at step S101, the emergency message transmitted by the server apparatus 20 is received. The emergency message is received via either the cellular communication network or the local network.

At step S102, it is judged whether the emergency message has been received via a cellular line or not. When a positive judgment is made here, it means that cellular communication is already available, and, therefore, the process ends. When a negative judgment is made here, the process transitions to step S103.

At step S103, it is judged whether there is a communication contract for cellular communication or not. For example, when the user contract information 102A is stored in the storage 102, a positive judgment is made at this step. Here, when there is a communication contract for cellular communication, the process transitions to step S104, where it is decided to perform attachment to the cellular communication network using the user contract information 102A. When attachment to the cellular communication network has been already performed, this step may be skipped.

When there is not a communication contract for cellular communication, the process transitions to step S105, where it is decided to perform attachment to the cellular communication network using the limited contract information 102B.

Figure 7:
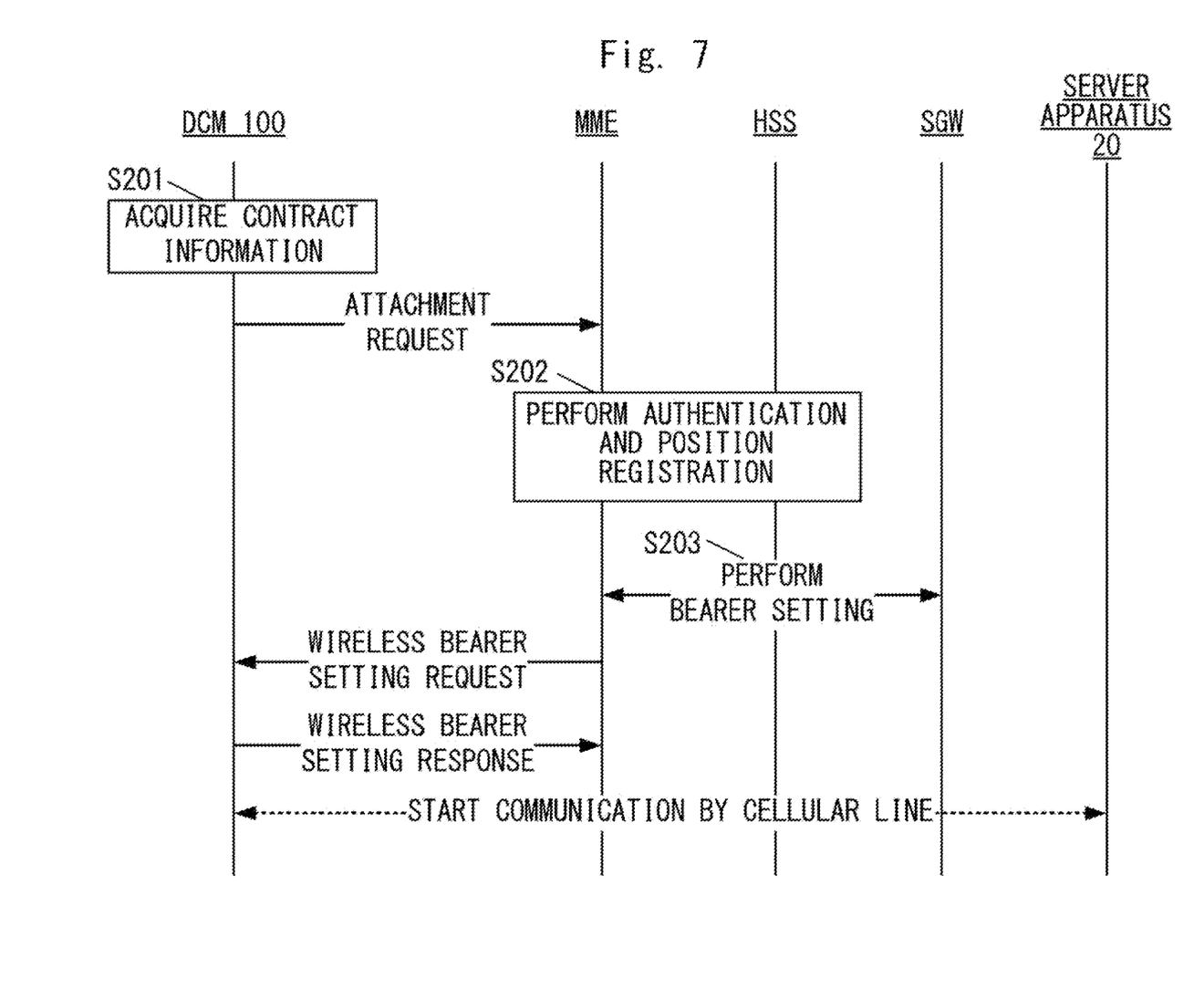
FIG. 7 is a flowchart of a process for attaching a DCM to a cellular communication network.

Next, the process for performing attachment to the cellular communication network will be described.

FIG. 7 is a diagram illustrating a process for the first communication module 110 of the DCM 100 to attach the DCM 100 to the cellular communication network.

First, at step S201, contract information is acquired, and an attach request including the contract information is generated. The generated attach request is transmitted to an MME (mobility management entity) which is a control node included in the cellular communication network.

At step S202, the MME transmits the contract information included in the attach request to an HSS (home subscriber server), which is a node that manages subscriber information, to request authentication. When the authentication is successful, terminal position registration is executed.

At step S203, the MME identifies a serving gateway (SGW) based on APN (access point name) information and requests bearer setting from the SGW. Further, the MME transmits a wireless bearer setting request to the DCM 100 based on a response from the SGW. When the DCM 100 responses thereto, communication via the cellular communication network is started.

When the server apparatus 20 transmits a cancellation message to the DCM 100, the DCM 100 stops attachment to the cellular communication network using the limited contract information.

The cancellation message is transmitted, for example, when any of the following conditions is satisfied:

(1) In a case where a judgment of not being under a predetermined emergency situation is made For example, a case where a predetermined time has passed after occurrence of an earthquake, or a case where a weather warning or the like is canceled.

(2) In a case where a judgment of important communication having been completed is made For example, a case where transmission of recall information or transmission of ECU firmware has been completed.

Figure 8:
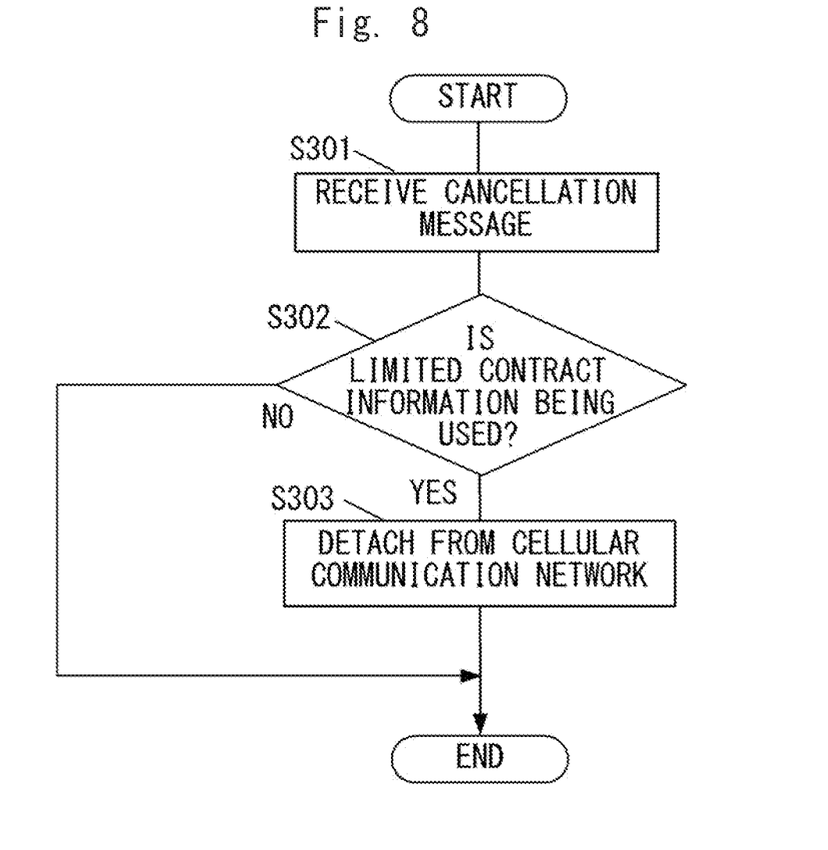
FIG. 8 is a flowchart of a process executed at step S30.

FIG. 8 is a flowchart illustrating the process executed at step S30 by the DCM 100 that receives the cancellation message in detail.

First, at step S301, the cancellation message transmitted by the server apparatus 20 is received. The cancellation message is received via a cellular line.

At step S302, it is judged whether the DCM 100 has performed attachment to the cellular communication network using limited contract information or not. When a negative judgment is made here, the process ends. When a positive judgment is made here, the process transitions to step S303, where detachment from the cellular communication network is executed.

Thereby, the cellular communication using the limited contract information ends.

As described above, the DCM 100 according to the present embodiment stores contract information that is limitedly used under a predetermined situation (limited contract information) and, when receiving an emergency message, performs attachment to the cellular communication network using the limited contract information. According to such a form, it becomes possible to cause the vehicle 10 to connect to the cellular communication network to perform data transmission/reception during a period in which communication with high urgency is to be performed.

For example, when the DCM 100 uses only the local network, communication stops accompanying start of movement of the vehicle 10. However, by causing the DCM 100 to connect to the cellular communication network, it is possible to cause data transmission/reception to be continued.

Modification of First Embodiment

Though cellular communication is exemplified as one of communication standards used by the DCM 100 in the first embodiment, the DCM 100 may use other communication standards. For example, the DCM 100 may be such that performs communication using a first communication channel and a second communication channel with a communication range narrower than that of the first communication channel.

Though the server apparatus 20 transmits an emergency message to all the vehicles 10 in the first embodiment, the server apparatus 20 may transmit an emergency message only to vehicles 10 without a communication contract when the server apparatus 20 grasps, for each of the plurality of vehicles 10, whether a communication contract has been contracted or not. A cancellation message may be transmitted only to vehicles 10 to which an emergency message has been transmitted.

Though the server apparatus 20 transmits an emergency message, and the DCM 100 starts use of limited contract information in response to the emergency message in the first embodiment, the limited contract information may be included in the emergency message.

Though the DCM 100 performs detachment from the cellular communication network in response to a cancellation message in the first embodiment, the process for performing detachment may be executed based on a different trigger. For example, detachment may be executed when a predetermined period after reception of an emergency message has elapsed or when the DCM 100 judges that reception of necessary data has been completed. The DCM 100 may receive detailed information about necessary data from the server apparatus 20 beforehand.

Other Modifications

The embodiment described above is a mere example, and the present disclosure can be appropriately changed and practiced within a range not departing from the spirit thereof.

For example, the processes and means described in the present disclosure can be freely combined and implemented unless technological contradiction occurs.

A process described as being performed by one apparatus may be shared and executed by a plurality of apparatuses. Or alternatively, processes described as being performed by different apparatuses may be executed by one apparatus. In a computer system, by what hardware configuration (server configuration) each function is realized can be flexibly changed.

The present disclosure can be realized by supplying a computer program implemented with the functions described in the above embodiments to a computer, and one or more processors that the computer includes reading out and executing the program. Such a computer program may be provided for the computer by a non-transitory computer-readable storage medium that can be connected to the system bus of the computer or may be provided for the computer via a network. As the non-transitory computer-readable medium, for example, any type of disk such as a magnetic disk (a floppy (registered trademark) disk, a hard disk drive (HDD) or the like) and an optical disk (a CD-ROM, a DVD disk, a Blu-ray Disc or the like), a read-only memory (ROM), a random access memory (RAM), an EPROM, an EEPROM, a magnetic card, a flash memory, an optical card, and any type of medium suitable for storing electronic instructions are included.

What is claimed is:

1. An information processing apparatus comprising:
   a data communication module (DCM) that includes (i) a first communication module configured to use a cellular communication network, and (ii) a second communication module configured to use a wireless communication network other than the cellular communication network; and
   a controller including at least one processor configured to, when receiving first data via the second communication module, perform a predetermined process related to communication performed by the first communication module, wherein
   the controller is configured to acquire first contract information and second contract information that are used by the first communication module.

2. The information processing apparatus according to claim 1, wherein the controller performs detachment from the cellular communication network when a predetermined trigger occurs.

3. The information processing apparatus according to claim 2, wherein the trigger occurs when the controller receives second data via the second communication module.

4. The information processing apparatus according to claim 3, wherein
   the first data includes information notifying occurrence of an emergency; and
   the second data includes information notifying cancellation of the emergency.

5. The information processing apparatus according to claim 2, wherein the trigger occurs when the controller completes reception of predetermined data via the first communication module.

6. The information processing apparatus according to claim 1, wherein
   the first contract information is information about a communication contract that a user has concluded; and
   the second contract information is information about a communication contract that becomes valid under a limited situation.

7. The information processing apparatus according to claim 6, wherein the predetermined process is a process for performing attachment to the cellular communication network using the second contract information.

8. The information processing apparatus according to claim 7, wherein the controller performs the predetermined process on condition that the first contract information that is valid cannot be acquired.

9. An information processing apparatus configured to communicate with a mobile terminal comprising a first communication module and a second communication module, the information processing apparatus comprising a controller including at least one processor configured to, when a predetermined trigger occurs, transmit first data for enabling the first communication module to be used, to the mobile terminal performing communication using the second communication module, wherein the second communication module is a communication module configured to use a wireless communication network through which handover cannot be performed, and the first communication module is a communication module configured to use a cellular communication network, wherein the first data includes contract information that becomes valid under a limited situation, and the controller causes the mobile terminal to perform attachment to the cellular communication network using the contract information.

10. A communication system comprising:

a first apparatus comprising a first communication module configured to use a cellular communication network and a second communication module configured to use a wireless communication network other than the cellular communication network; and a second apparatus; wherein when a predetermined trigger occurs, the second apparatus transmits first data for enabling the first communication module to be used, to the first apparatus performing communication using the second communication module; and when receiving the first data, and a communication contract that a user of the first apparatus has concluded does not exist, the first apparatus performs attachment to the cellular communication network using contract information that becomes valid under a limited situation.

11. The communication system according to claim 10, wherein when a second trigger occurs, the second apparatus transmits second data to the first apparatus; and when receiving the second data, the first apparatus performs detachment from the cellular communication network.

\* \* \* \* \*